United States Patent [19]
Currie

[11] Patent Number: 5,162,643
[45] Date of Patent: Nov. 10, 1992

[54] LIGHT DETECTING SYSTEM

[75] Inventor: George D. Currie, Burbank, Mich.

[73] Assignee: Imra America, Inc., Ann Arbor, Mich.

[21] Appl. No.: 661,001

[22] Filed: Feb. 26, 1991

[51] Int. Cl.⁵ .............................................. G01S 17/42
[52] U.S. Cl. ............................ 250/206.1; 250/206.2; 356/4; 356/141; 356/152
[58] Field of Search ............ 356/152, 141, 5, 4, 356/3; 250/206.2, 206.1, 561

[56] References Cited

U.S. PATENT DOCUMENTS

| | | | |
|---|---|---|---|
| 4,049,961 | 9/1977 | Marcy | 250/202 |
| 4,632,543 | 12/1986 | Endo | 356/5 |
| 4,703,240 | 10/1987 | Yoshimoto et al. | 318/587 |
| 4,727,492 | 2/1988 | Reeve et al. | 364/424.02 |
| 4,729,660 | 3/1988 | Tsumura et al. | 356/375 |
| 4,796,198 | 1/1989 | Boultinghouse et al. | 364/513 |
| 4,846,297 | 7/1989 | Field et al. | 180/169 |
| 4,849,644 | 7/1989 | Mira et al. | 250/561 |
| 4,895,440 | 1/1990 | Cain et al. | 356/5 |
| 4,902,126 | 2/1990 | Koechner | 356/5 |
| 4,999,483 | 3/1991 | Okamoto | 250/203.1 |

OTHER PUBLICATIONS

"LASERNET Scanning Laser Sensor-Intelligent Industrial Laser Scanner".
"LASERNET Scanning Laser Sensor-Web, Strip & Loop Monitoring & Control".
"NAMCO Product Data-LASERNET Web Width and Position Monitor".
"NAMCO Series LN150 Web Monitoring & Control Modules".
"NAMCO Application Note LASERNET Web Centerline Guidance".
"Emerging Technologies-Laser Radar Gives Both Image and Range".

*Primary Examiner*—Constantine Hannaher
*Attorney, Agent, or Firm*—Burns, Doane, Swecker & Mathis

[57] ABSTRACT

The present invention is directed to a light detecting system for accurately determining the lateral position of a moving object, such as a vehicle, relative to a point or points in advance of the object's current position along a desired path. In a preferred embodiment, no moving parts are required to illuminate a field of view in advance of the object's travel. Further, by providing separate range and angle detection channels, relatively compact overall size is actually achieved. Separation of these two channels permits integrating charge-coupled devices (CCD's) to be used in the relatively slow angle detection channel, while a single detector (e.g., single photodiode) is used in the relatively fast, range detection channel.

27 Claims, 2 Drawing Sheets

LIGHT DETECTING SYSTEM

BACKGROUND OF THE INVENTION

1. Field of the Invention

The present invention relates generally to methods and systems for detecting the position of a moving object relative to a path upon which the moving object is being controllably steered using reflected light. More particularly, the present invention relates to methods and systems for detecting a lateral position of a moving vehicle (e.g., an automobile), relative to a road surface ahead of the vehicle so that steering control signals required to maintain path alignment can be anticipated.

2. State of the Art

In the past, light sensing systems have been used for determining the position (e.g., lateral position) of moving objects, such as automobiles along a designated path. One such known system is described in U.S. Pat. No. 4,702,240, and uses an optical sensor to detect light reflected from a reflective portion of the road surface.

More particularly, this patent discloses illuminating an area immediately beneath a vehicle. A series of photocells are provided to detect the reflected beam. These reflections are transformed into data which represents derivation of the vehicle from a desired path. This data is thus used to control vehicle steering and realign the vehicle on the path. Such a system suffers from the disadvantage that it only scans an area immediately beneath the vehicle to derive reflection data. Accordingly, the system is unable to anticipate upcoming changes in the road contour fast enough for vehicle steering to be automatically controlled.

U.S. Pat. No. 4,049,961 relates to an automatic guidance system for an automobile wherein lasers are used to scan a limited region ahead of the automobile. However, this system merely indicates the deviation of the vehicle position from an imaginary centerline of the roadway. Thus, the system disclosed in U.S. Pat. No. 4,049,961 is unable to determine road curvature in response to reflected signals and is therefore not able to anticipate required steering control in response to changing road geometry.

In co-pending U.S. application Ser. No. 07/592,235, filed Oct. 3, 1990, a moving oscillating reflector is disclosed for sweeping a light source back and forth across a given field of view forward of vehicle travel However, such moving parts are susceptible to damage (e.g., due to vibration) and/or fatigue in relatively hostile environments, such as automobiles.

Figure 1:
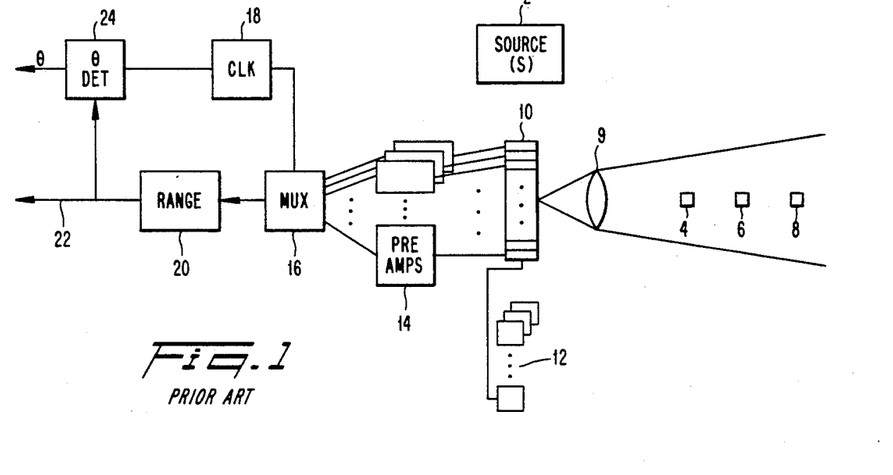
FIG. 1 shows an exemplary light detecting system for use in vehicle control.

U.S. application Ser. No. 07/592,235 further discloses an alternate embodiment of a light detecting system for use in determining lateral position of a moving object. One example of such a system is shown in FIG. 1. The FIG. 1 system includes a stationary light source 2, such as a laser, for illuminating a predetermined field of view. The field of view is selected to include reflectors 4, 6 and 8 situated in advance of the vehicle's direction of movement.

Light reflected by the reflectors 4, 6 and 8 is received by a light detector 10 via a lens 9. The light detector 10 includes, for example, 20 to 35 PIN diodes or avalanche photo-diodes (APD's). A corresponding number of bias power supplies are represented generally as element 12, and a corresponding number of pre-amplifiers are represented generally as element 14. A separate bias power supply and pre-amplifier are typically required for each diode of the detector array 10.

Outputs from each pre-amplifier are applied to a multiplexor 16 which is controlled by clock 18. Multiplexor 16 sequentially gates amplified data received by a selected one of the diodes to a range counter 20. The output 22 of the range counter 20 represents the vehicle distance to a selected reflector. Further, light received by the range counter is directed to an angle detector 24 for determining an angular orientation of the reflected light.

In operation, pulsed light from the light source 2 is reflected by one or more of the reflectors. Reflected light is focused by lens 9 onto detector array 10. The output associated with a selected diode in detector array 10 is then passed via the multiplexor 16 to the range counter 20.

The range counter 20 is a digital counter which counts the number of clock pulses that occur between the time a light pulse from light source 2 is transmitted and received by one of the diodes in the detector array 10. Such information represents the range of the vehicle to a given reflector. Further, by identifying the diode in the detector array which received the reflected light pulse, the angle of the reflected light can be readily ascertained.

Thus, the FIG. 1 system can provide lateral position information based on detected range and angle data. However, the FIG. 1 system involves a plurality of photodiodes, bias power supplies, preamplifiers and a multiplexor. This arrangement results in relatively high production costs.

Further, not only does the use of a multiplexor increase system cost and complexity, but in addition, the multiplexor can potentially introduce detection inaccuracies. More particularly, the multiplexor selects the output of a single diode as an input to the range counter. Therefore, when a reflected light pulse is received by a given diode, the output of that diode must be selected by the multiplexor.

To permit accurate control of a vehicle along a desired path, reflectors should be sensed at a distance of, for example, 50 feet in advance of the vehicle. Because an exemplary light source pulse has a pulse width of 5 to 20 nanoseconds (ns) and will travel at a rate of one foot per nanosecond (ft/ns), a reflected light pulse will typically be detected approximately 100 ns after transmission. However, a conventional multiplexor requires 300 nanoseconds (ns) to scan an array of diodes as described above.

Thus, there is a possibility that a received light pulse will dissipate in a diode of the detector array prior to the point in time at which the multiplexor accesses the diode. This detection problem can be associated with a lack of charge storage in the detector array. More particularly, because the same detector array is used for providing both range data (i.e., fast detection) and angle data (i.e., slow detection), outputs of the detector array can not be latched.

Further, while a relatively small size system would be desirable for implementation, an ability to reduce the size of the foregoing light detection system is limited. For example, the optical detector array 10 is relatively large in size (i.e., 20 to 35 detectors), resulting in an array which is one to two inches long. This relatively large detector array is required to obtain a desirable aspect ratio (e.g., field of view 10° wide and 4.5° high).

In addition, diode detectors as described above include insulating spacers between each photodiode, these spacers being approximately 30 micrometers wide. Thus, a relatively large spot of light must be focused onto the detector array. On the contrary, if, for example, a focused light spot having a diameter of 10 micrometers is used, the spot may fall totally within the insulating spacer, thus avoiding detection and resulting in data loss.

The use of a large detector array also requires that the lens 9 have a capability of focusing light along a greater distance. It is desirable to provide a lens having a focal length to diameter ratio that is as close to one as possible (i.e., high speed lens). A relatively large lens (e.g., 7 inches in diameter) would therefore be required to provide a 10° field of view and to focus light on diodes in the one to two inch detector array.

Accordingly, it would be desirable to provide a light sensing system capable of reliably anticipating the contour of a desired path upon which a moving object, such as a vehicle, is being steered. Further, it would be desirable to provide a system capable of sensing the lateral position of the vehicle relative to locations far enough in advance of the vehicle's current position that changes in path contour can be anticipated.

SUMMARY OF THE INVENTION

The present invention is directed to a light detecting system for accurately determining the lateral position of a moving object, such as a vehicle, relative to a point or points in advance of the object's current position along a desired path. In a preferred embodiment, no moving parts are required to illuminate a field of view in advance of the object's travel. Further, by providing two separate range and angle detection channels, overall size reduction is actually achieved. Separation of these two channels permits integrating charge-coupled devices (CCD's) to be used in a relatively slow, angle detection channel, while a single detector (e.g., single photodiode) is used in the relatively fast, range detection channel.

BRIEF DESCRIPTION OF THE DRAWINGS

Other objects and advantages of the present invention will become more apparent from the following detailed description of preferred embodiments when read in conjunction with the accompanying drawings wherein like elements have been assigned like reference numerals, and wherein.

DETAILED DESCRIPTION OF THE PREFERRED EMBODIMENTS

Figure 2:
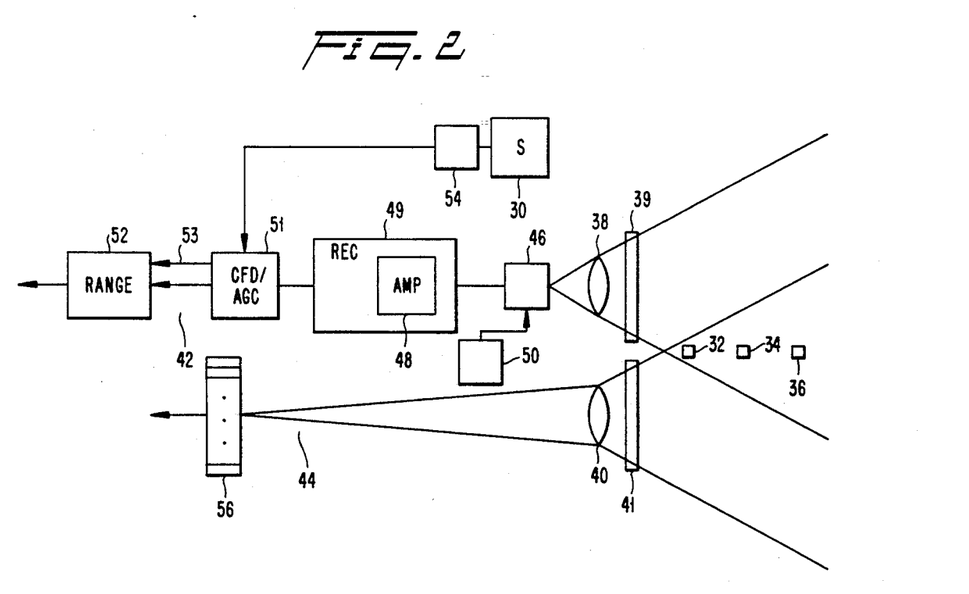
FIG. 2 shows an exemplary preferred embodiment of a light detecting system in accordance with the present invention.

FIG. 2 shows a preferred embodiment of a light based, object detection system. In FIG. 2, a light source 30 is provided for illuminating a field of view in front of a moving object along a direction of travel.

For purposes of the following discussion, particular reference will be made to an automobile as the moving object which is to be controlled. It will be appreciated, however, that the invention is applicable to the position determination of any object which is to be guided along a predetermined path. For example, the invention would be equally applicable to the control of automated robots guided along predetermined paths.

Further, particular reference will be made to use of a fixed field of view relative to a direction of vehicle movement. As referenced herein, fixed refers to the use of a stationary (i.e., non-scanning light source). It will be appreciated, however, that a scanning light can be used. In addition, the field of view can be established in any direction. For example, a field of view can be established in a lateral direction (i.e., beside the moving vehicle to control vehicle orientation) or in a direction opposite that of vehicle movement to detect other vehicles for purpose of collision avoidance.

Further, any combination of fields of view can be used. For example, a second lateral field of view can be used to derive additional information on yaw (i.e., rotation about a vertical axis of the vehicle).

The light source 30 is, for example, a medium power infrared diode laser light source which includes a transmitter operating at approximately 100 watts peak power on a wavelength of approximately 850 nanometers (nm). Such a device is readily available from, for example, Laser Diode, Inc., New Brunswick, N.J., U.S.A.

In an exemplary preferred embodiment, the laser diode device provides a 5ns pule width at a 2000 Hz pulse rate. It will be appreciated, however, that any known laser may be used as the light source 30. Further, the light source can be a visible or ultraviolet (non-laser) light source.

In an alternate preferred embodiment, both a medium power infrared light source and an incandescent light source are used as the light source 30. With such an embodiment, the infrared light source is pulsed to permit accurate range detection in a range detection channel. The incandescent light source is used to provide enhanced reflection intensity from reflectors placed along the desired path of vehicle motion. The enhanced intensity reflections permit increased resolution of an angle channel detection without increasing the power intensity of the infrared light source.

Retroreflectors, or reflectors 32, 34 and 36 are shown along a side of the path which the vehicle is to be guided. Light reflected from the reflectors is directed toward an infrared filter 41 and a lens 38 in the range detection channel and toward an infrared filter 39 and a lens 40 in the angle detection channel. Each of the lenses 38 and 40 are relatively high speed, with focal length to diameter ratios (i.e., f numbers) approximately equal to one. Further, the lenses 38 and 40 are approximately one to two-inches in diameter. While the lenses are shown adjacent, in an alternate embodiment, coaxial lenses may be used.

In a preferred embodiment, the filters 39 and 41 are set for 850 nm, ±100 Angstroms. However, depending on design constraints such as potential temperature variations, other bandwidths may be used e.g , 850 nm±10 to 200 Angstroms). Further, a thermoelectric heat pump, such as that available from Marlow Industries Inc., Garland, Tex., can be used to maintain a relatively constant temperature for the range and angle detecting components, thus permitting use of narrower bandwidth filters over a range of operating environments.

A heat pump can also be used to cool the CCD detector to reduce dark current. This will allow for increased signal to noise ratios in the angle channels.

In an alternate embodiment, the infrared filters can be placed on opposite sides of the lenses 38 and 40, in the range and angle channels. Alternately, mirrors with sharply peaked reflectivities can be situated in the range and angle channels for use as the filters.

The range detection channel is represented generally as element 42 in FIG. 2 while the angle detection channel is represented generally as element 44. Light received by the lens 38 in the range detection channel is focused onto a single detector 46. The detector 46 is, for example, a single photosensitive diode, such as a single PIN diode or avalanche photo-diode (APD). For purposes of simplifying the following discussion, the detector 46 will be considered an APD detector.

Light received by the single detector 46 is converted to an electrical signal and input to a single pre-amplifier 48. The pre-amplifier 48 is, for example, included as part of an APD receiver 49. Such a receiver is available with a Model 900-20 Semiconductor Laser Ranger/Object Locator, from Analog Modules, Inc., Longwood, Fla., U.S.A. The receiver 49 further includes a post amplifier and a variable gain amplifier.

The variable gain is controlled by a constant fraction discriminator and automatic gain control (AGC) board 51, also available from Analog Modules Inc. The constant fraction discriminator selects the point in time at which a reflected pulse reaches 50% of its maximum intensity as the pulse arrival time. A voltage bias circuit, such as an APD bias 50, is provided to bias the detector 46 when received light energy is being transferred to the pre-amplifier 48 in known fashion.

An output from the constant fraction discriminator 51 is input to a range counter 52. Range counter 52 also receives an input 53 via the constant fraction discriminator from a light transmit sensor 54. In an exemplary embodiment, the range counter 52 is a known device available with the aforementioned Model 900-20 Ranger/Object Locator from Analog Modules, Inc.

The light transmit sensor outputs a pulse to the range counter each time a light pulse is actually emitted from the light source 30 (i.e., at the 2000 Hz pulse rate). The pulse from the light transmit sensor activates the range counter 52 to initiate a counting of clock pulses in known fashion. The range counter 52 continues to count clock pulses until a pulsed output is received by the APD detector. Thus, the range counter stores a count proportional to the time required for a light pulse to travel from the light source 30 to one of the reflectors and back to the range detection channel.

The angle detection channel 44 includes the lens 40 which also receives light from the reflectors 32, 34 and 36. The lens 40 focuses an image of the reflectors on a charge-coupled device (CCD) array 56. The CCD array is a row of relatively small light sensitive detectors, each of which integrate the amount of light received over a predetermined period of time. Because the CCD array is not used to detect light for the relatively fast range detection channel, the CCD array can be permitted to detect light over a period corresponding, for example, transmission of plural light pulses from the light source 30.

More particularly, light pulses are transmitted from the source 2 at a rate of 2000 Hz. A maximum speed of the moving vehicle is set beforehand to, for example, 60 mph (i.e., 88 ft/sec.) In an exemplary embodiment, the range and angle of a single detector is determined at each measurement interval. However, in an alternate preferred embodiment, road contour is determined using the first 3 reflectors in the illuminated field of view.

At the maximum speed, a determination of the range and angle to each of the first three reflectors in a field of view is made every 0.1 seconds. Because the range to a three reflectors can be detected in less than 2-3 msec at the maximum speed, a sufficient portion of the 0.1 second sampling period is provided for the CCD array to integrate the 2000 Hz light source pulses to determine angle data.

A row of detectors in the CCD array are controlled via electronic shutters in known fashion. For example, when data in analog form is to be read out of the CCD array 56 (i.e., every 0.1 seconds) a bias is applied to the detectors in the array to inhibit further accumulation of charge due to light received via lens 40. The analog data read out of the CCD array can be converted to digital information representing the angle from a reference point on the moving vehicle to each reflector in the field of view, and then correlated with range data.

In an exemplary embodiment, approximately 128 detectors are included in the CCD array. Despite this relatively high number of slow speed (i.e., integrating) light detectors, a typical CCD array of this size is approximately 6.3 millimeters, with an insulator space between each detector being approximately one micrometer in size.

Thus, a focused image of the reflectors as provided by the lens 40 can be formed as a 5 to 10 micrometer beam without fear of lost data. While the focused beam may bridge more than one CCD detector, it will not fall totally within an insulator region and go undetected, as was described previously with respect to FIG. 1.

Further, despite using relatively small lenses 38 and 40 (i.e., 1 to 2 inch diameter) and CCD array 56 (i.e., 6.3 mm) a relatively high aspect ratio can be obtained. For example, in the preferred embodiment described above, a 10° wide by 4.5 ° high field of view can be imaged on the CCD array.

Thus, the FIG. 2 system is well suited to applications where spatial dimensions are critical, such as in the automobile industry. Further, despite the use of two separate detection channels for range and angle, overall system size is relatively small and compact.

Figure 3:
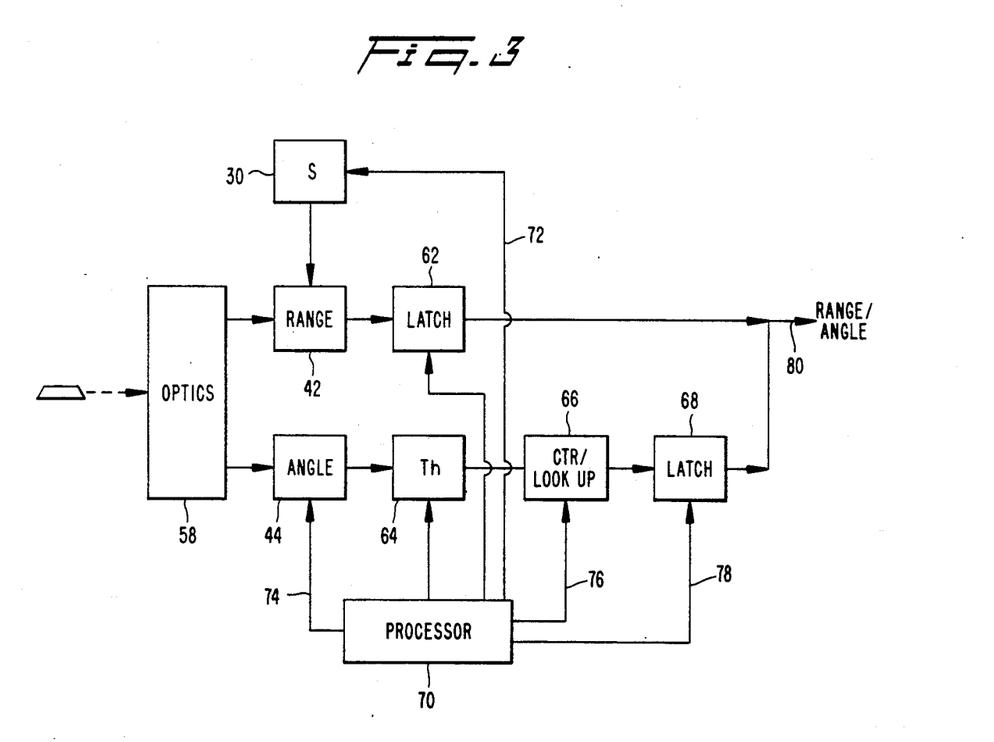
FIG. 3 shows a more detailed illustration of portions of the FIG. 2 light detecting system.

FIG. 3 shows a more detailed illustration of a light detection system in accordance with the preferred embodiment of FIG. 2. Light received from reflector 34 is focused via the Figure lenses and filters, collectively represented as optics 58 in FIG. 3. Reflected light is focused onto a single detector in the range detector channel 42. In FIG. 3, the light source 30 transmits light from the range detect channel. Reflected light is focused on the range channel 42. Further, reflected light is focused onto a CCD array in the angle detector channel 44.

As described above, light pulses are transmitted at 2000 Hz to determine range information for a given reflector. The detection of range data is correlated with angle data from the angle detection channel so that the angle and range data of a particular reflector can be paired to determine lateral position of the moving object.

For this purpose, a reflected pulse received by the single range detector is latched in an output latch 62. An output of the output latch 62 directly corresponds to the range from a reference point on the moving object to a given reflector.

A threshold detector receives an output from the angle detection channel. More particularly, the integrated charges stored in each of the CCD array detectors are serially shifted out of the CCD array. Although serial output of the CCD array is described herein, it will be appreciated by those skilled in the art that a parallel read of analog information stored in the CCD array could be performed as well.

Each serially output value from the CCD array is compared with a threshold value in the threshold detector 64. This threshold is an experimentally determined intensity above that of typical ambient light or light reflected from surfaces other than the retroreflectors placed along the roadside.

Every 4 sequential detectors in the CCD array correspond to a specific angle between the moving object (i.e., the vehicle) and a position along the path (i.e., roadside) in the field of view. That is, while 128 detectors are provided in the CCD, only 40 locations are required to distinguish angle information with the desired resolution.

Each angle location is therefore allotted three of the CCD detectors in an exemplary embodiment. When the light intensity detected in a particular location (i.e., set of 3 detectors) of the CCD array is determined to exceed the experimentally determined threshold, the angular location of a reflector relative to a reference point on the moving vehicle can be readily determined.

To keep track of the detector position in the CCD array currently being examined, a position counter 66 is provided. With each comparison in the threshold detector 64, position counter 66 is incremented. Because each detector in the CCD array corresponds to a predetermined angular location in the illuminated field, a detector intensity value which exceeds the threshold can be readily translated into an angular position.

In the exemplary embodiment described above, 128 detectors are included in the CCD array and a 10° field of view is illuminated and monitored. Accordingly, each detector measures 0.01° in the field of view. Every three detectors thus measures an angle of 0.03°. Using a look-up table in the position counter, a CCD detector position identified as corresponding to a reflector location can then be directly converted into angular position information, and stored in an output latch 68.

A clock and timing logic associated with a processor 70 are also provided to assemble pairs of range and angle data in a memory of the detection device. These data pairs can then be used for vehicle direction control.

More particularly, the clock and timing logic 70 initiates transmission of a light source pulse via an actuating signal 72. At that time, the CCD array is initialized via line 74 such that all detectors are biased to the same charge.

As mentioned previously, the range detection channel includes a clocked counter to record the time between pulses. Once this counter is stopped in response to the receipt of a reflected pulse, the output latch is enabled to store the range data therein. Further, the CCD array is biased via the electronic shutter, and its contents serially examined via the threshold detector 64 and the position counter 66.

For this purpose, the threshold detector and position counter are enabled via lines 76 and 78, respectively. Once all positions of the CCD array have been examined, and the angle identified, output latch 68 is loaded with the information.

Subsequently, the output latches 62 and 68 are simultaneously enabled and output onto a line 80. The information on line 80 thus identifies the range and angle of a particular reflector pair.

In operation, light pulses are transmitted at a rate of 2000 Hz. Every 0.1 seconds, the detectors in the CCD array 44 are serially read. The angle corresponding to the first threshold exceeding location is identified via use of detector 64 and position counter 66. Immediately prior to the CCD array being read, range data corresponding to the range of the first reflector (i.e., the reflector closest to the vehicle) in the field of view is detected.

In an alternate embodiment, after a light pulse is transmitted, the range detector channel 42 is used to identify the first reflector's range using the first reflected pulse detected (i.e., the reflected pulse of highest intensity) as described above. A second counter determines the range to the second sequential reflector in the field of view by detecting receipt of the second reflected pulse (i.e., reflected pulse of slightly less intensity). A third counter determines the range to the third sequential reflector (i.e., reflected pulse of even less intensity) in similar manner.

Alternately, three transmitted pulses are used in connection with a single range counter and three threshold levels to determine range to each of the first three reflectors in the field of view. Latching of the range to each of the three reflectors in latch 62 is synchronized with the serial reading of the reflector angles. Thus, range and angle information can be correlated for each reflector.

Each range and angle pair is then stored in memory, such as a RAM associated with processor 70 (e.g., Intel 80C196 16 bit microprocessor). The range and angle information can then be processed in a manner as described, for example, in co-pending U.S. application Ser. No. 07/592,235, filed Oct. 3, 1990 to control vehicle steering.

Because the range and angle information for 1 to 3 reflectors is determined every 0.1 seconds, several road contour calculations will be obtained using the same reflector (reflectors). As the moving vehicle passes a reflector, the next reflector or reflectors in the field of view are then used to determine road contour and vehicle position (e.g., adjust lateral position of vehicle to maintain path alignment).

As mentioned previously, a 10° (i.e., 10° horizontal) by 4.5° (i.e., 4.5° vertical) field of view is used in a preferred embodiment. Further, reflectors are located on the ground along the roadside. It will be appreciated, however, that any desired field of view may be used. Similarly, various placements of reflectors (e.g., on posts next to the roadside) may be used to improve the signal to noise ratio of a reflected pulse or to accommodate road conditions such as snow. In addition, any light pulse transmission rate and associated data acquisition interval may be selected to accommodate a desired maximum rate of vehicle motion.

In an exemplary embodiment, the roadside reflectors have a reflectivity gain of approximately 2000 times the reflective power of a standardized Lambertion reflector. However, any reflector which provides an adequate signal to noise ratio for a given light source intensity may be used.

Further, where it is desired to increase the bandwidth of the range detection channel, an additional detector and associated channel may be provided. When using two such channels, smaller detector areas may be used to enhance range resolution and sensitivity.

While the exemplary embodiment described above refers to the use of three reflectors to determine road geometry, it will be appreciated that any number of reflectors can be used. For example, a single reflector's range and angle data can be detected, and compared with a previously detected reflector's data to identify guidance errors of the vehicle and/or changes in path contour.

Further, in an alternate embodiment, the false alarm rate of the angle detection can be improved by ignoring CCD detector locations known in advance to correspond with areas where reflectors are not located. More particularly, if the reflectors along the path are known to be separated a predetermined distance, a window can be established during read out of the detector array to identify locations where the next threshold exceeding detector intensity can be expected, to distinguish foreign objects or other clutter (e.g., pavement, glass, trees and so forth) along the roadside. For example, a metal can located on the roadside might cause a reflection in the CCD array to exceed the threshold. However, if the detector sensing that reflection corresponds to an angle outside the window, then this detected reflection can be discarded as corresponding to an errant reflection.

It will be appreciated that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description, and all the changes that come within the meaning and range and equivalents, thereof are intended to be embraced therein.

What is claimed is:

1. Optical detector comprising:
    means for transmitting light to create a field of view;
    means for detecting said transmitted light following reflection from at least one object located in said field of view, said detecting means further including:
    a range channel having a first detector for sensing reflected light from said at least one object to determine a distance to said at least one object; and,
    an angle channel having a second detector for sensing reflected light from said at least one object to determine an angle of said reflected light.

2. Apparatus according to claim 1, wherein said distance and angle are used to determine orientation of a vehicle relative to the at least one object.

3. Apparatus according to claim 2, wherein said field of view is fixed relative to a predetermined direction of vehicle movement.

4. Apparatus according to claim 3, wherein said means for transmitting includes an infrared light source.

5. Apparatus according to claim 3, wherein said range channel further includes a light filter and lens for focusing a predetermined bandwidth of reflected light on the first detector.

6. Apparatus according to claim 5, wherein said angle channel further includes a light filter and lens for focusing a predetermined bandwidth of reflected light on the second detector.

7. Apparatus according to claim 3, wherein said field of view is fixed in a direction forward of vehicle movement.

8. Apparatus according to claim 3, wherein said field of view is fixed in a direction opposite that of vehicle movement.

9. Apparatus according to claim 1, wherein said first detector is a single PIN diode.

10. Apparatus according to claim 1, wherein said first detector is a single avalanche diode.

11. Apparatus according to claim 10, wherein said second detector is a CCD array.

12. Apparatus according to claim 1, wherein said second detector is a CCD array.

13. Apparatus for detecting the position of an object relative to a moving vehicle comprising:
    means for transmitting a source of light to create a stationary field of view in a direction forward of vehicle movement;
    means for detecting said transmitted light following reflection from at least one object located in said field of view, said detecting means further including;
    a range channel having a first detector for sensing reflecting light from said at least one object to determine a distance from said vehicle to said at least one object; and,
    an angle channel having a second detector for sensing reflected light from said at least one object to determine an angle of said reflected light, said distance and angle being used to determine orientation of the vehicle relative to the at least one object.

14. Apparatus according to claim 13, wherein said means for transmitting includes an infrared light source.

15. Apparatus according to claim 14, wherein said first detector is a single avalanche diode.

16. Apparatus according to claim 15, wherein said second detector is a CCD array.

17. Apparatus according to claim 13, wherein two or more range channels are used to provide said distance.

18. Apparatus according to claim 13, wherein said transmitting means is a laser.

19. Method for detecting the position of an object relative to a moving vehicle comprising the steps of:
    transmitting a source of light to create a stationary field of view in a direction forward of vehicle movement;
    detecting said transmitted light following reflection from at least one object located in said field of view, said step of detecting including:
    sensing reflecting light from said at least one object to determine a range from said vehicle to said at least one object; and,
    sensing reflected light from said at least one object to determine an angle of said reflected light, said range and angle being used to determine orientation of the vehicle relative to the at least one object.

20. A vehicle guidance system for optically guiding a moving vehicle along a path using an optical detector comprising:
    means for transmitting light from a moving vehicle to create a field of view fixed relative to the moving vehicle;
    means for detecting said transmitted light following reflection from at least one stationary object located in said field of view to automatically steer the vehicle along said path, said detecting means further including:
    a range channel having a first detector for sensing reflected light from said at least one object to determine a distance from said moving vehicle to said at least one object; and, an angle channel having a second detector for sensing reflected light from said at least one object to determine an angle of said reflected light.

21. Apparatus according to claim 20, wherein said means for transmitting includes a pulsed laser light source, said angle channel sensing reflected light over a period corresponding to plural transmission pulses of said pulsed laser light to determine said angle of reflected light.

22. Apparatus according to claim 20, wherein said first detector is a single PIN diode.

23. Apparatus according to claim 22, wherein said second detector is a CCD array.

24. Apparatus according to claim 23, wherein said CCD array includes a plurality of detectors, outputs from each of said detectors being compared with thresholds set above ambient light but below an intensity of laser light reflected by said at least one object.

25. Apparatus according to claim 23, wherein said field of view imaged on said CCD array is a 10° wide by 4.5° high field of view, said CCD array being approximately 6.3 mm in length.

26. Apparatus according to claim 20, wherein said first detector is a single avalanche diode.

27. Apparatus according to claim 20, wherein said detecting means uses sensed reflections from at least three stationary objects to determine a contour of said path, correlating pairs of range and angle data for each of said at least three objects.

* * * * *

UNITED STATES PATENT AND TRADEMARK OFFICE
CERTIFICATE OF CORRECTION

PATENT NO. : 5,162,643

DATED : November 10, 1992

INVENTOR(S) : George D. Currie

It is certified that error appears in the above-identified patent and that said Letters Patent is hereby corrected as shown below:

On title page, item [75], delete "Burbank" and insert -- Ann Arbor--.

Signed and Sealed this

Fifth Day of October, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,162,643

DATED : November 10, 1992

INVENTOR(S) : George D. Currie

It is certified that error appears in the above-identified patent and that said Letters Patent is hereby corrected as shown below:

On the title page:

Item :[75], delete "Imra" and insert -- IMRA--.

Signed and Sealed this

Twenty-first Day of December, 1993

Attest:

BRUCE LEHMAN

*Attesting Officer*   *Commissioner of Patents and Trademarks*